INVENTORS
JOHN H. BALLARD
JOHN E. HINES, JR.
BY
ATTORNEY

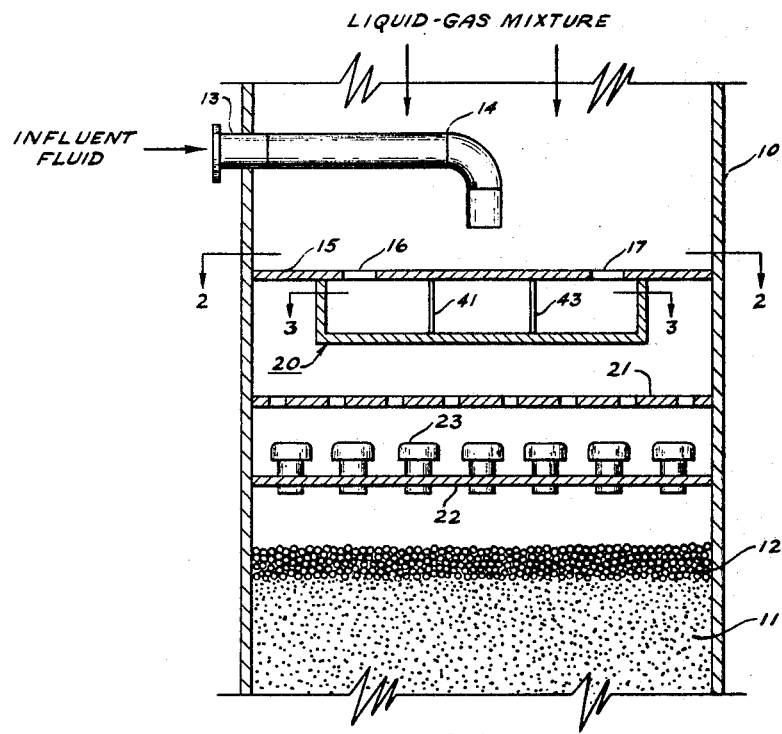
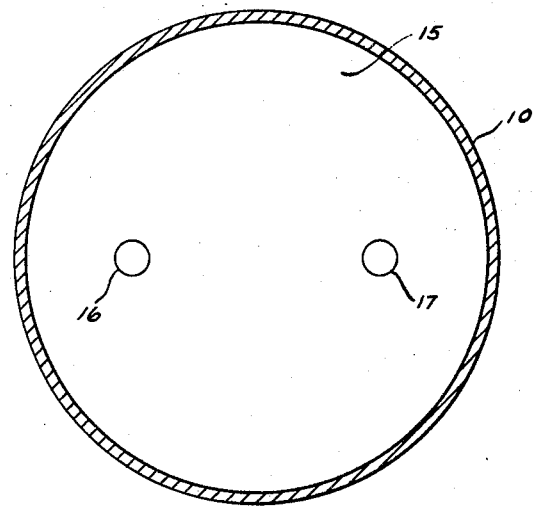

United States Patent Office

3,502,445
Patented Mar. 24, 1970

---

3,502,445
APPARATUS FOR MIXING FLUIDS IN CONCURRENT DOWNFLOW RELATIONSHIP
John H. Ballard, Whittier, and John E. Hines, Jr., Newport Beach, Calif., assignors to Union Oil Company of California, Los Angeles, Calif., a corporation of California
Filed Nov. 2, 1966, Ser. No. 591,476
Int. Cl. B01f 9/04, 1/14
U.S. Cl. 23—288                                      15 Claims

ABSTRACT OF THE DISCLOSURE

A fluid mixing device for intimately mixing vapors and liquids passing downwardly through a downflow contacting vessel, the device comprising a horizontal tray extending across the cross-section of the vessel and having two spaced apertures opening into a mixing box attached to the underside of the tray, the mixing box having a constricted cross-section or internal baffles to cause the fluids entering the box through the apertures in the tray to impinge within the box prior to discharge therefrom.

---

This invention relates generally to the mixing of fluids in concurrent downflow relationship, and more particularly to an improved apparatus for mixing fluids flowing downwardly in a fixed bed downflow contacting vessel. This apparatus is particularly adapted for mixing gas and liquid flowing downwardly in concurrent relationship.

Many commercial processes require the intimate mixing of fluids in generally downflow relationship, and particularly the mixing or contacting of a liquid with a gas. For example, in processes involving the physical or chemical treatment of hydrocarbons and other organic materials, it is often advantageous to contact two-phase mixtures of liquids and gases or vapors with fixed beds of granular contact materials, and particularly with fixed beds of particle-form solids having catalytic activity. Although a two-phase feed mixture can be intimately mixed by conventional means prior to introduction to the bed of solid contact material, separation of the gas and liquid can thereafter occur in the contact bed resulting in channelling and other undesirable effects. It is therefore necessary that the downflowing liquid and gaseous fluids be remixed and redistributed uniformly over the horizontal cross-section of the contact bed. In another aspect, it is frequently advantageous to introduce additional liquid or gaseous fluids at intermediate points in the vertical length of the contact bed. Where the introduced fluid is at a different physical or chemical condition than the downflowing fluids at the point of introduction, it is usually advantageous that these fluids be intimately admixed prior to their being passed to subsequent contacting zones. Thorough mixing and uniform distribution is particularly essential in the case of downflow catalytic reactors, since the increased efficiency resulting therefrom can materially reduce the quantity of catalyst required and the size of the reactor vessel.

Apparatus for effecting the mixing of the liquid and gaseous fluids in a fixed bed downflow contacting device is proposed in our U.S. Patent No. 3,218,249. This apparatus includes a horizontal solid tray extending over the cross-section of the vertical contacting vessel. Appended immediately below the tray and attached thereto is a mixing box. Two relatively large diameter apertures in the tray open into the mixing box. The outlet from the mixing box also comprises two large apertures in the bottom of the box offset 90 degrees from the inlet apertures. Gases and liquids discharged from the mixing box are distributed over the cross-section of the vessel by means of a perforated tray located below the mixing box and a further distribution tray containing a plurality of downcomer assemblies positioned below the perforated tray. Although our patented apparatus is a marked improvement over prior art devices for this service, and affords satisfactory results in many applications, even more complete mixing is sometimes advantageous in certain extremely critical applications, such as in the catalytic hydrofining of hydrocarbons, than can be effected with the patented device.

Accordingly, an object of the present invention is to provide an improved device for the mixing of fluids in concurrent downflow relationship. Another object of this invention is to provide means for effecting the substantially complete mixture of gas and liquid flowing downwardly in concurrent relationship. Still another object is to provide an improved means for effecting interstage gas and liquid mixing in a downflow contacting vessel. A further object is to provide improved means for introducing a fluid into a mixture of liquid and gas flowing downwardly in a contacting vessel. A still further object is to provide means for improving the efficiency of a mixed fluid phase downflow contacting operation. These and other objects will be apparent to those skilled in the art from the following description.

Briefly, the present invention involves an improved fluid mixing apparatus for use in a downflow contacting device. The salient feature of this invention is the addition of internal flow directing means to the mixing box of our patented fluid mixing apparatus which cause the entering fluid streams to impinge, thus creating a zone of turbulent mixing within the box. The flow directing means can comprise internal baffles or, alternatively, flow direction can be effected by specially shaping the side walls of the mixing box to provide a throat of reduced cross-section. The improved mixing box of this invention is particularly adapted for use in combination with means for distributing the admixed fluids over the cross-section of a contacting vessel. In another aspect, one embodiment of the improved mixing box of this invention is provided with side outlets to reduce the vessel space required for installation of the mixing and distribution apparatus.

The invention will be more readily understood by reference to the following detailed description and the accompanying drawings, of which:

FIGURE 1 is an elevation view of a section of a fixed solids bed downflow contacting vessel, in cross-section, illustrating the installation of the improved mixing box of this invention;

FIGURE 2 is a plan view of the vessel cross-section taken along the line 2—2 of FIGURE 1 and showing the collection tray immediately above the mixing box;

It is to be understood that although the fluid distribution apparatus of this invention is broadly applicable to any downflow contacting system, it is particularly useful in catalytic reaction systems. For example, the device has specific application in the catalytic treatment of hydrocarbons, and particularly in mixed phase catalytic treatments, such as catalytic hydrodesulfurization and hydrocracking. Other catalytic processes in which the mixing device of this invention has particular utility are the catalytic polymerization, isomerization and reforming of petroleum hydrocarbons, catalytic hydrogenation of liquid coal extracts, catalytic hydorgenation of aromatic compounds, such as the conversion of benzene to cyclohexane, catalytic oxidation, catalytic chlorination, and the like. It is to be further understood that references to gas or gases, unless otherwise specifically stated, includes both permanent gases, such as hydrogen, oxygen and nitrogen, and also components in the vapor state under the contacting conditions.

Figure 3:
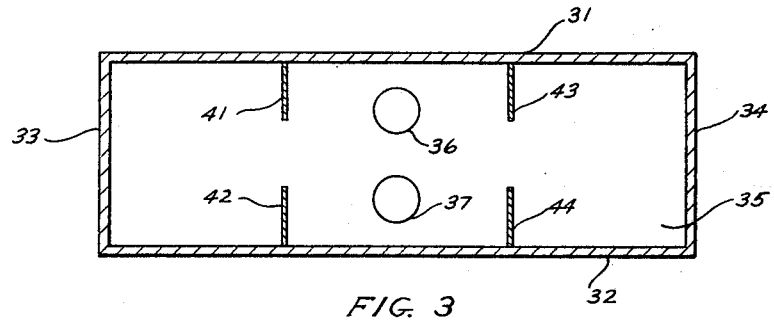
FIGURE 3 is a cross-sectional plan view of the embodiment of the mixing box of FIGURE 1, taken along the line 3—3 of FIGURE 1.

The general arrangement of a mixing apparatus according to one embodiment of this invention in a downflow contacting device is illustrated in FIGURES 1, 2 and 3. Typical of such contacting devices are downflow catalytic reactors in which a fluid flows generally downwardly through the vessel, passing through and contacting one or more beds of particle-form solids, such as beds of solid catalyst granules. Fluids can be added or withdrawn intermediate the contact bed, where desired. The mixing device of this invention is adapted for installation in the top of a downflow contacting vessel for pre-mixing fluid feed to a contacting zone, or alternatively, the device may be installed intermediate two contacting zones. Accordingly, the contact media may comprise a plurality of contact beds, and mixing devices according to this invention can be located above one or more of these beds. Although the fluid mixing apparatus of this invention can be installed in a vessel of any size and cross-sectional configuration, a vertical cylindrical vessel having a length greater than its diameter is conventionally employed in many fluid contacting applications.

With particular reference to FIGURE 1, there is shown a section of a downflow contacting device comprising cylindrical vertical shell 10 containing a bed of granular contact particles 11. In many applications, it is desirable to overlay particle bed 11 with a layer of chemically inert spherical particles 12, such as ceramic balls of fused alumina, or the like. These chemically inert particles are preferably of larger size than the particles of bed 11, and act to prevent impingement of the down-flowing fluids directly onto the particle bed 11, thus preventing disruption of the upper surface of the particle bed and reducing attrition of these particles. Fluids, such as mixtures of liquids and gases, flow downwardly from a fluid inlet, not shown, located in an upper part of the vessel, or the downflowing fluids can be the effluent from an upper contacting zone. Where desired, a fluid can be introduced into the contacting vessel by means of nozzle 13 and internal pipe 14. In such cases, it is preferred that the introduced fluid be symmetrically injected into the downflowing fluid. One preferred embodiment of apparatus for injecting a fluid symmetrically into a second downflowing fluid is disclosed in Patent No. 3,342,193 issued September 1967, on copending application Ser. No. 445,380, filed Apr. 5, 1965.

Collection tray 15 extends across the cross-section of the contacting vessel, and serves to direct the downflowing fluids through two spaced openings 16 and 17 therein, illustrated in FIGURE 2. Tray 15 can be removably attached around its periphery to the shell 10 by means capable of a substantially leak-free seal. Alternatively, and especially in larger diameter vessels, tray 15 is formed in sections and supported upon a beam structure attached to the shell 10. These sections can be permanently attached, as by welding; however, in such construction, it is preferred to leave at least one removable section to provide access through the vessel for cleaning and maintenance.

Mixing box 20 is positioned immediately below tray 15, and is fixedly attached thereto by welding, or other means. Although not limited as to shape, the mixing box 20 can conveniently comprise a generally rectangular configuration. Since in many applications the spacing between tray support members limits the width of the box, it is often advantageous to employ a box having an elongated rectangular shape. The box 20 can be constructed from separate pieces, or can be integrally formed from a single metal sheet by conventional cutting and bending techniques. In any case, the box is provided with two outlet openings oriented 90 degrees from the inlet openings in tray 15.

The above-described mixing device is conventionally employed with a distribution means such as the perforated tray 21 and distribution tray 22 having a plurality of downcomer and cap assemblies 23 thereon. As is more fully described in our U.S. Patent No. 3,218,249, the distribution means are located below the tray 15 and above the upper surface of the particulate solids bed. However, in some cases where distribution of a liquid phase is not a problem, the distribution means can be omitted and the tray 15 and mixing box 20 installed in spaced relationship above the particle bed.

In our previously patented device, mixing is accomplished by the successive division and recombination of the down-flowing fluid. Specifically, the fluid passing downwardly through the shell 10 is divided into two streams of more or less similar compositions and flow quantities passing through the two openings 16 and 17 in tray 15. On entering the mixing box, each of these fluid streams is again divided into two streams of approximately equal composition and flow quantity, each of these streams being combined with a similar portion of the fluid stream passing through the opposite opening in tray 15 and passing outwardly through one of the two exit openings in the mixing box.

The novel feature of this invention is the addition of flow directing means in the mixing box to cause the fluids passing through the box to impinge in a turbulent mixing zone prior to discharge from the box. In one embodiment of this invention, the flow directing means comprises a pair of opposed transverse baffles which afford a restricted opening for the passage of fluid therebetween, and direct the fluid emitted therefrom toward a fluid stream passing between another pair of transverse baffles located on the opposite side of the outlet openings. In this manner, the fluid streams impinge adjacent the outlet openings to provide the additional turbulent mixing step.

One embodiment of the present invention is illustrated in FIGURE 3, wherein is seen an elongated, rectangular mixing box formed by the side pieces 31 and 32, the end pieces 33 and 34, and bottom member 35. Bottom member 35 is provided with two relatively large diameter openings 36 and 37, preferably arranged on a center line normal to the longitudinal axis of the box and spaced approximately equidistantly on either side of the longitudinal axis. Alternatively, the openings can be located in the side members 31 and 32 instead of bottom member 35. In either case, the box is provided with opposed transverse baffles 41 and 42 which form a partial partition on one side of openings 36 and 37, and with baffles 43 and 44 which form a partial partition on the opposite side of these openings. These baffles preferably extend from the bottom of the box to the tray 15. Accordingly, the mixing box is divided into three chambers by the two pairs of transverse baffles, the openings 36 and 37 being within the central chamber and the box being oriented in relation to tray 15 so that openings 16 and 17 communicate with either of the outer chambers of the box.

Thus, in operation, the downflowing fluid streams passing through each of the openings 16 and 17 in tray 15 enter into the outer chambers of the mixing box 20 and pass between one pair of transverse baffles to the center chamber, whereupon the two opposed fluid streams impinge adjacent outlet openings 36 and 37. Mixing is beneficially affected by reducing the openings between opposed transverse baffles so as to impart higher velocities to the fluids flowing therethrough. However, a reduction in the flow area between the baffles also causes increased pressure drop. The proper spacing between opposed baffles is a balance between the improvement in fluid mixing attained and the magnitude of the increase in pressure drop. While these considerations are a function of the geometry of the mixing box, in many applications it is convenient to extend each of the baffles across between about ¼ to ⅓ of the flow area, between about ⅓ to about ½ of the cross-sectional area of the box then being available for fluid passage.

Figure 4:
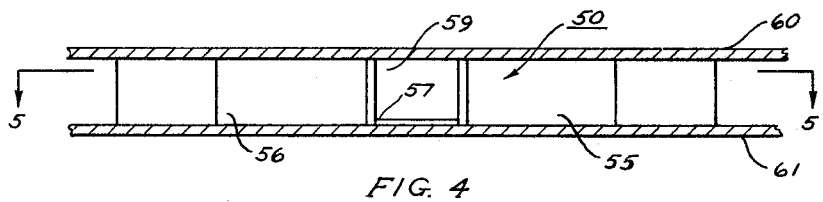
FIGURE 4 is a partial side elevation view showing an embodiment of improved mixing box having side outlets installed between two horizontal trays.
Figure 5:
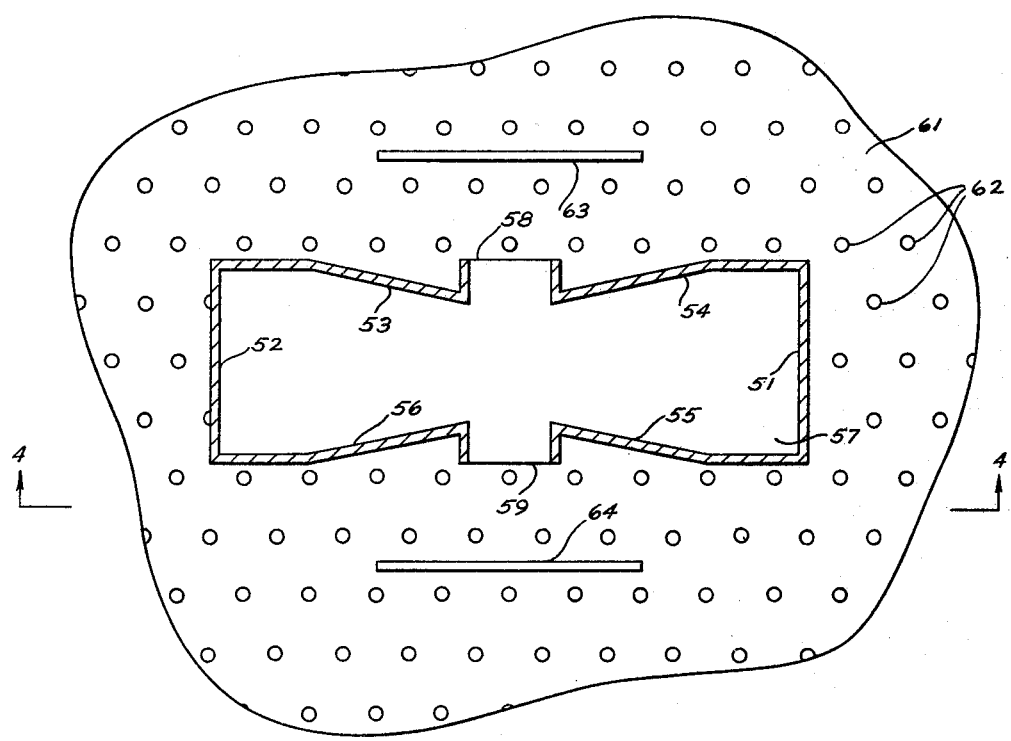
FIGURE 5 is a cross-sectional plan view of the embodiment of FIGURE 4.

In another and preferred embodiment, illustrated in FIGURES 4 and 5, flow direction is achieved by forming the side walls of the mixing box to provide a restricted fluid passage. Referring particularly to FIGURE 4, an elongated, generally rectangular mixing box 50 is shown installed immediately below the tray 60, which corresponds to collection tray 15 of FIGURE 1, and immediately above the tray 61, having perforations 62 and corresponding to perforated tray 21 of the previously described embodiment. Of course, the tray 61 can be omitted where uniform distribution of a liquid phase is not critical.

As shown in FIGURE 5, mixing box 50 is comprised of end members 51 and 52, side members 53, 54, 55 and 56, and bottom member 57. In this embodiment, the bottom member 57 is formed of solid sheet metal, the outlet openings 58 and 59 being located on opposed sides of the box. As before, the side and end members can be formed from separate pieces and assembled in conventional manner, or members 53, 52 and 56, and members 54, 51 and 55 can be formed integrally, bent into the required shape, and then affixed to bottom member 57. In either case, flow direction is achieved by bending each of the members 53, 54, 55 and 56 inwardly to form a necked down section on either side of outlet openings 58 and 59. In this embodiment, the fluids enter the chambers on either side of the central necked down section, pass through one or the other of these convergent sections, and impinge in the center section adjacent outlet openings 58 and 59. In still another embodiment, a rectangular box having openings in opposed side members is fitted with inserts to form the convergent section illustrated in FIGURE 5.

The perforations 62 in tray 61 can be omitted from the area of the tray occupied by the mixing box. Alternatively, the bottom member 57 can be omitted and the side members of mixing box 50 attached directly to tray 61.

The mixing and distribution of two-phase fluids can be further facilitated by placing transverse vertical baffles 63 and 64 adjacent side outlets 58 and 59, but removed therefrom as illustrated in FIGURE 5. The baffles 63 and 64 are preferably constructed of perforate material and attached directly to tray 61, the baffles extending vertically substantially to tray 60. It is also preferred that the area of tray 61 between the side outlets 58 and 59 and the baffles 63 and 64, be left imperforate.

Mixing and distribution of a downflowing fluid can be materially improved in many applications by utilization of an improxed mixing box and distribution means according to the various embodiments of apparatus heretofore described. This improved mixing and distribution is manifested by greater uniformity in the chemical composition and physical condition of fluid exiting the distribution means. A further advantage of the embodiment of mixing box having side outlets according to the embodiment of FIGURES 4 and 5 is that the space required for installation of the mixing and distribution apparatus is substantially reduced so as to ultimately effect a reduction in the vessel height, or alternatively, in more of the vessel space becoming available for other purposes.

While particularly embodiments of the invention have been described, it will be understood, of course, that the invention is not limited thereto since many modifications can be made and it is intended to include within the invention any such modifications as fall within the scope of the claims.

The invention having thus been described, we claim:

1. In combination with a contacting vessel, an apparatus for mixing a substantially downflowing fluid mixture, which comprises:

a substantially horizontal tray extending across the cross-section of said vessel and having at least two openings therethrough located substantially equidistant from a center axis of said vessel and spaced substantially equidistant about said center axis;

a mixing box attached to the underside of said tray and supported therefrom, said mixing box having side and bottom members and said tray serving as a top member of said box, said openings in said tray opening into said mixing box, and said box having at least two exit openings located substantially equidistant about said center axis of said vessel and substantially uniformly offset about said center axis from said openings in said tray; and flow directing means within said box for causing the fluid streams passing downwardly through said openings in said tray to impinge in a center area of said mixing box prior to discharge therefrom through said exit openings.

2. The apparatus defined in claim 1 wherein said flow directing means comprise two pair of opposed vertical transverse baffles, a pair of said baffles being located on opposite sides of said exit openings between said exit openings and said openings in said tray.

3. The apparatus defined in claim 2 wherein each of said opposed baffles extends from a side wall across between about one-fourth and about one-third of the cross-section of said mixing box.

4. The apparatus defined in claim 1 wherein said exit openings are in said bottom member of said mixing box.

5. The apparatus defined in claim 1 wherein said flow directing means are formed by a throat of reduced cross-section between said exit openings and each of said openings in said tray, and wherein said exit openings are located in opposed side walls.

6. In combination with a contacting vessel containing a particulate solids bed, an apparatus for mixing and distributing a substantially downflowing fluid mixture, which comprises:

a substantially horizontal tray extending across the cross-section of said vessel above said particulate solids bed, said tray having at least two openings therethrough located substantially equidistant from a center axis of said vessel and spaced substantially equidistant about said center axis;

an elongated rectangular mixing box attached to the underside of said tray and supported therefrom, said mixing box having side and bottom members and said tray serving as a top member of said box, said openings in said tray opening into said mixing box, and said box having at least two exit openings located substantially equidistant about said center axis of said vessel and substantially uniformly offset about said center axis from said openings in said tray;

flow directing means within said box for causing the fluid streams passing downwardly through said openings in said tray to impinge in a center area of said mixing box prior to discharge therefrom through said exit openings; and distribution means located below the said horizontal tray and above the said particulate solids bed for distributing the downflowing fluids uniformly over the cross-section of the bed.

7. The apparatus defined in claim 6 wherein said exit openings are in the bottom member of said mixing box, and wherein said flow directing means comprise two pair of opposed vertical transverse baffles, a pair of said baffles being located on opposite sides of said openings between said exit openings and said openings in said tray, and each of said baffles extending from a side wall across between about one-fourth and about one-third of the cross-section of said mixing box.

8. The apparatus defined in claim 6 wherein said flow directing means are formed by a throat of reduced cross-section between said exit openings and each of said openings in said tray, and wherein said exit openings are located in opposed side walls.

9. The apparatus defined in claim 8 wherein said distribution means includes a horizontal perforate tray extending across the cross-section of said vessel located immediately below and proximate said mixing box.

10. The apparatus defined in claim 6 including a plurality of particulate solids beds in spaced relationship and having said mixing and distribution apparatus above each of said solid bed.

11. In combination with a contacting vessel containing a particulate solids bed, an apparatus for mixing and distributing a substantially downflowing fluid mixture, which comprises:

a substantially horizontal tray extending across the cross-section of said vessel above said particulate solids bed, said tray having two openings therethrough located substantially equidistant from the center axis of said vessel and spaced approximately 180 degrees about said center axis;

an elongated rectangular mixing box attached to the underside of said tray, said mixing box having elongated side members, end members and a bottom member and said tray serving as a top member of said box, said openings in said tray opening into said mixing box adjacent either end of said box, and said box having an outlet opening proximate the midpoint of each of the elongated side members, the opposing side members of said box converging to form a zone of restricted cross-section between each of the said openings in said tray and said outlet openings in said side members;

a horizontal perforate tray extending across the cross-section of said vessel located immediately below and proximate said mixing box; and a horizontal tray containing a plurality of downcomer means, each of said downcomer means being surmounted by a cap and said tray being placed in spaced relationship below said perforate tray and above said particulate solids bed.

12. The apparatus defined in claim 11 including a plurality of particulate solids beds in spaced relationship and having said mixing and distribution apparatus above each of said solids beds.

13. The apparatus defined in claim 11 wherein said side members are flared outwardly to define said outlet openings in said side members.

14. The apparatus defined in claim 11 including a transverse vertical baffle attached to said perforate tray on each side of said mixing box, said baffles being parallel to and spaced apart from said outlet openings in the side members of said mixing box.

15. The apparatus defined in claim 14 wherein said baffles are perforate and the section of said perforate tray between said outlet openings and said transverse baffles is imperforate.

References Cited

UNITED STATES PATENTS

| | | | |
|---|---|---|---|
| 2,701,184 | 2/1955 | Rupp | 23—288 |
| 3,143,581 | 8/1964 | Walter | 23—288 X |
| 3,218,249 | 11/1965 | Ballard et al. | 23—288 X |

JOSEPH SCOVRONEK, Primary Examiner

U.S. Cl. X.R.

23—284; 208—85; 261—97, 110, 111